United States Patent
Yoshikawa

(10) Patent No.: US 10,750,095 B2
(45) Date of Patent: Aug. 18, 2020

(54) DISPLAY CONTROL APPARATUS AND METHOD FOR CONTROLLING THE SAME

(71) Applicant: CANON KABUSHIKI KAISHA, Tokyo (JP)

(72) Inventor: Akio Yoshikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 59 days.

(21) Appl. No.: 16/133,967

(22) Filed: Sep. 18, 2018

(65) Prior Publication Data
US 2019/0098223 A1 Mar. 28, 2019

(30) Foreign Application Priority Data

Sep. 27, 2017 (JP) .................................. 2017-186845
Jun. 8, 2018 (JP) .................................. 2018-110510

(51) Int. Cl.
*H04N 5/232* (2006.01)

(52) U.S. Cl.
CPC ... *H04N 5/232939* (2018.08); *H04N 5/23216* (2013.01); *H04N 5/23296* (2013.01); *H04N 5/232933* (2018.08); *H04N 5/232935* (2018.08)

(58) Field of Classification Search
CPC ....... H04N 5/232939; H04N 5/232935; H04N 5/232933; H04N 5/23296; H04N 5/23216; H04N 5/23293
See application file for complete search history.

(56) References Cited

U.S. PATENT DOCUMENTS

| 9,778,686 B2 | 10/2017 | Yoshikawa et al. | |
|---|---|---|---|
| 2004/0090546 A1* | 5/2004 | Doron | H04N 5/232 348/240.1 |
| 2013/0055119 A1* | 2/2013 | Luong | G06F 3/04883 715/764 |

FOREIGN PATENT DOCUMENTS

| JP | 2005-257375 A | 9/2005 |
|---|---|---|
| JP | 2014-154905 A | 8/2014 |

* cited by examiner

*Primary Examiner* — Ahmed A Berhan
(74) *Attorney, Agent, or Firm* — Venable LLP

(57) ABSTRACT

A display control apparatus comprises a detection unit configured to detect a user operation made to an operation member; a control unit configured to perform control to perform zoom processing at a zooming speed corresponding to an operation amount of the operation member in accordance with an operation made to the operation member, while a live view image is being displayed; and a display control unit configured to perform control to perform pseudo zooming display using a sample image that differs from the live view image, so that an object in the sample image is enlarged or reduced at a speed corresponding to the operation amount of the operation member in a setting screen for setting the zooming speed corresponding to an operation made to the operation member for the zoom processing.

21 Claims, 10 Drawing Sheets

FIG. 5A
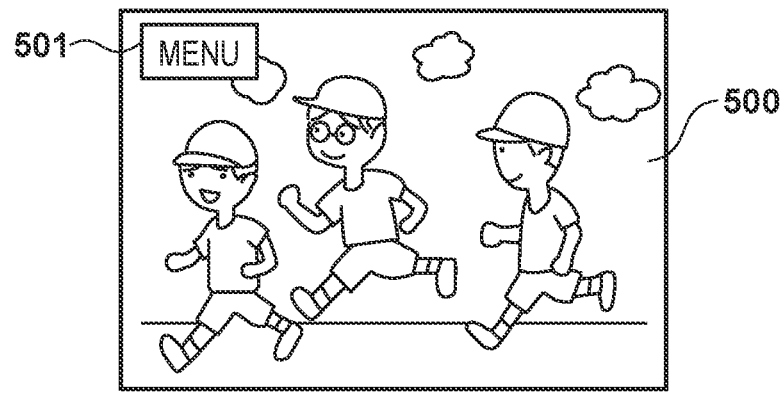
FIG. 5B
| OPERATION AMOUNT LEVEL (pos) | ZOOMING SPEED |
|---|---|
| 1 | 1 |
| 2 | 5 |
| 3 | 6 |
| 4 | 8 |
| 5 | 16 |
FIG. 5C
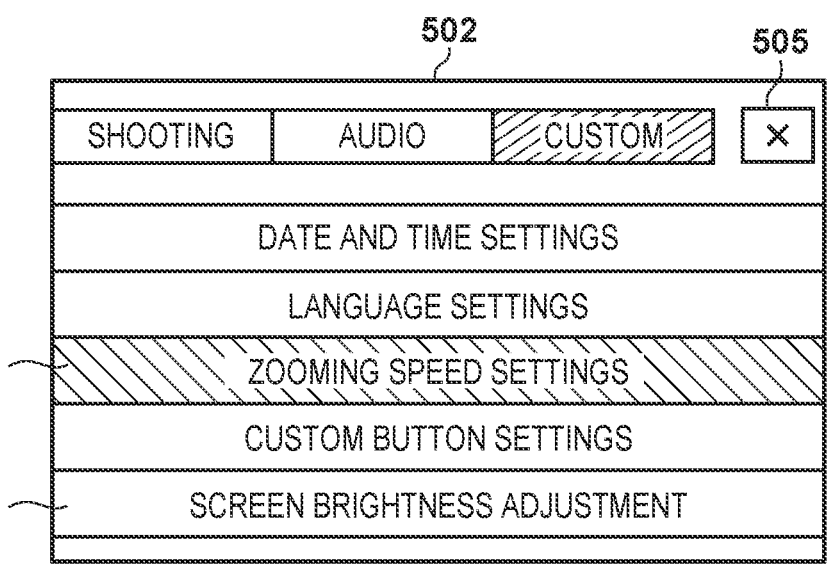

DISPLAY CONTROL APPARATUS AND METHOD FOR CONTROLLING THE SAME

BACKGROUND OF THE INVENTION

Field of the Invention

The present invention relates to a technique for performing display in accordance with an operation amount.

Description of the Related Art

Conventionally, a method is known in which a value corresponding to an operation amount is displayed on an in-vehicle digital display to notify a user of an amount of change in data relative to the current operation amount (Japanese Patent Laid-Open No. 2005-257375). Japanese Patent Laid-Open No. 2014-154905 discloses that a reference image acquired from a camera is electronically enlarged and reduced to simulate zooming.

However, when a user checks that processing corresponding to an operation amount is performed, e.g. when checking zooming speed relative to the operation amount of a zoom lever, even if the zooming speed relative to the operation amount of the zoom lever is displayed as a value, as in Japanese Patent Laid-Open No. 2005-257375, it is difficult to intuitively perceive the actual sense of speed. Meanwhile, even if a change in the angle of view is shown on a display device in accordance with an instructed zooming speed, as in Japanese Patent Laid-Open No. 2014-154905, after the operation is continued by a specific amount and then a telephoto end (hereinafter, "tele end") or a wide angle end (hereinafter, "wide end") is reached, the angle of view no longer changes even if the zoom lever is operated, and it is therefore difficult to physically check the zooming speed relative to a zooming operation amount.

SUMMARY OF THE INVENTION

The present invention has been made in consideration of the aforementioned problems, and realizes a technique of allowing a user to intuitively check the speed of processing corresponding to an operation amount.

In order to solve the aforementioned problems, the present invention provides a display control apparatus comprising: at least one processor or circuit to perform operations of the following units: a detection unit configured to detect a user operation made to an operation member; a control unit configured to perform control to perform zoom processing at a zooming speed corresponding to an operation amount of the operation member in accordance with an operation made to the operation member, while a live view image is being displayed; and a display control unit configured to perform control to perform pseudo zooming display using a sample image that differs from the live view image, so that an object in the sample image is enlarged or reduced at a speed corresponding to the operation amount of the operation member in a setting screen for setting the zooming speed corresponding to an operation made to the operation member for the zoom processing.

In order to solve the aforementioned problems, the present invention provides a display control apparatus comprising: at least one processor or circuit to perform operations of the following units: a detection unit capable of detecting that a user operation made to an operation member has been accepted; and a control unit configured to perform control to perform predetermined processing in accordance with an operation made to the operation member, wherein the control unit controls a screen that enables the predetermined processing to be accepted, to cause an image displayed on a display unit to make a predetermined change in display appearance in accordance with an operation amount of the operation member, and cause, after the display appearance of the image has reached a predetermined state, the image to not make the predetermined change in display appearance even if an operation is made to the operation member, and the control unit controls a setting screen for configuring a setting related to the predetermined processing, to display, on the display unit, a sample image that does not reach the predetermined state even if the sample image makes the predetermined change in display appearance in accordance with the operation amount of the operation member.

In order to solve the aforementioned problems, the present invention provides a control method of a display control apparatus, the method comprising: detecting a user operation made to an operation member; performing control to perform zoom processing at a zooming speed corresponding to an operation amount of the operation member in accordance with an operation made to the operation member, while a live view image is being displayed; and performing control to perform pseudo zooming display using a sample image that differs from the live view image, so that an object in the sample image is enlarged or reduced at a speed corresponding to the operation amount of the operation member in a setting screen for setting the zooming speed corresponding to an operation made to the operation member for the zoom processing.

In order to solve the aforementioned problems, the present invention provides a control method of a display control apparatus having a detection unit capable of detecting that a user operation made to an operation member has been accepted, and a control unit configured to perform control to perform predetermined processing in accordance with an operation made to the operation member, the method comprising: controlling a screen that enables the predetermined processing to be accepted, to cause an image displayed on a display unit to make a predetermined change in display appearance in accordance with an operation amount of the operation member, and cause, after the display appearance of the image has reached a predetermined state, the image to not make the predetermined change in display appearance even if an operation is made to the operation member, and controlling a setting screen for configuring a setting related to the predetermined processing, to display, on the display unit, a sample image that does not reach the predetermined state even if the sample image makes the predetermined change in display appearance in accordance with the operation amount of the operation member.

In order to solve the aforementioned problems, the present invention provides a non-transitory computer-readable storage medium storing a program for causing a computer to function as a display control apparatus comprising: a detection unit configured to detect a user operation made to an operation member; a control unit configured to perform control to perform zoom processing at a zooming speed corresponding to an operation amount of the operation member in accordance with an operation made to the operation member, while a live view image is being displayed; and a display control unit configured to perform control to perform pseudo zooming display using a sample image that differs from the live view image, so that an object in the sample image is enlarged or reduced at a speed corresponding to the operation amount of the operation member in a setting screen for setting the zooming speed corresponding to an operation made to the operation member for the zoom processing.

In order to solve the aforementioned problems, the present invention provides a non-transitory computer-readable storage medium storing a program for causing a computer to function as a display control apparatus comprising: a detection unit capable of detecting that a user operation made to an operation member has been accepted; and a control unit configured to perform control to perform predetermined processing in accordance with an operation made to the operation member, wherein the control unit controls a screen that enables the predetermined processing to be accepted, to cause an image displayed on a display unit to make a predetermined change in display appearance in accordance with an operation amount of the operation member, and cause, after the display appearance of the image has reached a predetermined state, the image to not make the predetermined change in display appearance even if an operation is made to the operation member, and the control unit controls a setting screen for configuring a setting related to the predetermined processing, to display, on the display unit, a sample image that does not reach the predetermined state even if the sample image makes the predetermined change in display appearance in accordance with the operation amount of the operation member.

According to the present invention, a user can intuitively check the speed of processing corresponding to an operation amount.

Further features of the present invention will become apparent from the following description of exemplary embodiments (with reference to the attached drawings).

BRIEF DESCRIPTION OF THE DRAWINGS

FIG. 5A shows an example of displaying a live view image according to the present embodiment.

FIG. 5B shows an example of a correspondence relationship between the operation amount of a zoom lever and zooming speed according to the present embodiment.

FIG. 5C shows an example of a menu screen that includes a zooming speed setting menu according to the present embodiment.

DESCRIPTION OF THE EMBODIMENTS

Hereinafter, embodiments for implementing the present invention will be described in detail with reference to the accompanying drawings.

Apparatus Configuration

External configuration and functions of a digital video camera (hereinafter "camera") as a display control apparatus and an image capture control apparatus according to the present embodiment will be described below with reference to FIGS. 1 and 2A-2B.

Figure 1:
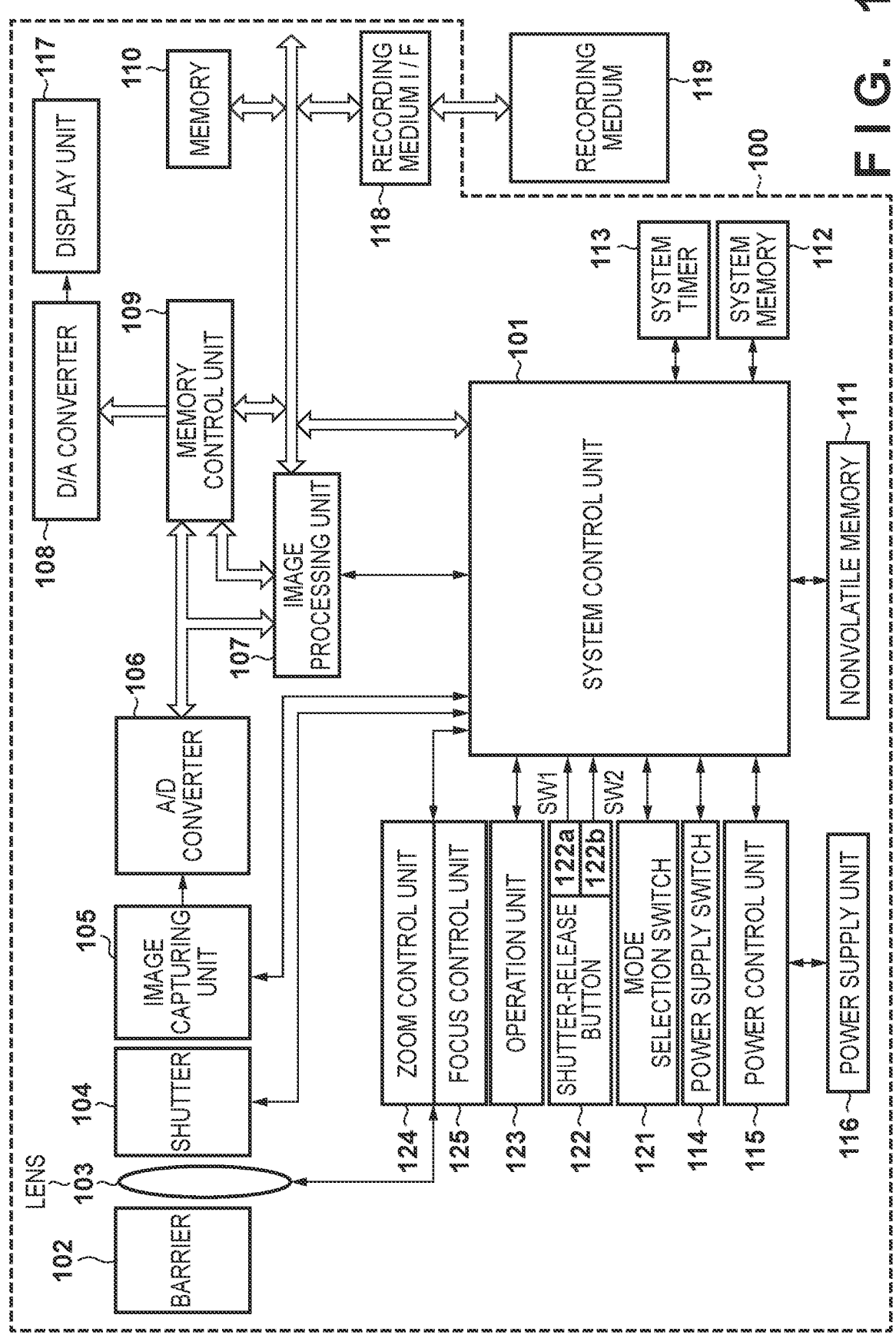
FIG. 1 is a block diagram illustrating an image capture control apparatus of the present embodiment.

FIG. 1 is a block diagram illustrating an example of a configuration of a camera 100 of the present embodiment.

In FIG. 1, a photographing lens 103 is a lens group that includes a zoom lens and a focusing lens. The zoom lens is a lens for changing a display magnification (zoom magnification) of the image by changing the focal length, and is controlled by a zoom control unit 124. The focusing lens is a lens for performing focusing, and is controlled by a focus control unit 125. A shutter 104 has a diaphragm function. An image capturing unit 105 is an image sensor, which is constituted by a CCD or CMOS or the like, for converting the optical image of an object to an electric signal. An A/D converter 106 converts an analog signal to a digital signal. The A/D converter 106 is used to convert an analog signal, which is output from the image capturing unit 105, to a digital signal. A barrier 102 covers the image capturing system which includes the photographing lens 103 of the camera 100, thereby preventing contamination of and damage to the image capturing system that includes the photographing lens 103, shutter 104 and image capturing unit 105. Note that the photographing lens 103 may be fixed to or detachable from the camera 100.

An image processing unit 107 performs resizing processing, such as predetermined pixel interpolation and reduction, and color conversion processing, with respect to data from the A/D converter 106 or data from a memory control unit 109. Further, the image processing unit 107 performs predetermined calculation processing using the captured image data, and the system control unit 101 performs exposure control and distance measuring control based on the calculation results. Thus, AF (Automatic Focus) processing, AE (Automatic Exposure) processing, and EF (flash pre-emission) processing of TTL (Through the Lens) type are performed. Furthermore, the image processing unit 107 performs predetermined calculation processing using the captured image data, and AWB (Automatic White Balance) processing of TTL type is performed on the basis of the calculation results.

The output data from the A/D converter 106 is directly written into a memory 110 via both the image processing unit 107 and the memory control unit 109 or via the memory control unit 109. The memory 110 stores the image data obtained from the image capturing unit 105 and converted into digital data by the A/D converter 106, and image data to be displayed on the display unit 117. The memory 110 has a storage capacity that is sufficient for storing a predetermined number of still images as well as moving images and audio for a predetermined time period.

The memory 110 also functions as a memory for image display (video memory). A D/A converter 108 converts the image display data stored in the memory 110 into an analog signal and supplies the display unit 117 with the analog signal. The image display data that was written into the memory 110 is displayed by the display unit 117 via the D/A converter 108. The display unit 117 performs, on a display device, display in accordance with the analog signal from the D/A converter 108. The digital signals once converted by the A/D converter 106 and stored in the memory 110 are converted into analog signals by the D/A converter 108, and the analog signals are successively transmitted to the display unit 117 so as to be displayed thereon, making it possible to realize an electronic view finder (EVF) functionality and to perform through the lens image display.

The display unit 117 is a liquid-crystal display, for example, and later-described liquid-crystal brightness adjustment corresponds to a setting of backlight luminance. Note that the display unit 117 is not limited to a liquid-crystal display, and may alternatively be another type of display, such as an organic EL (Organic Electroluminescence) display. In the case of an organic EL display, the aforementioned brightness adjustment is a setting of luminance of light-emitting elements that emit light by itself.

A nonvolatile memory 111 is, for example, an EEPROM, which is electrically erasable and recordable. In the nonvolatile memory 111, constants and programs, for example, for operating the system control unit 101 are stored. In this context, "programs" may refer to programs for executing various types of flowcharts that will be described later.

The system control unit 101 is a calculation processing device for overall controlling the entire camera 100, and realizes, by executing the programs stored in the nonvolatile memory 111, the display control processing of the present embodiment that will be described later. The system memory 112 is, for example, a RAM and used also as a work memory where constants and variables for operating the system control unit 101, and the programs read out from the nonvolatile memory 111 are expanded. The system control unit 101 controls the memory 110, the D/A converter 108, the display unit 117, and the like, so as to perform display control.

A system timer 113 is a timer circuit for measuring time periods for various types of controls and the time of an integrated clock.

The mode selection switch 121, a first shutter switch 122*a*, a second shutter switch 122*b* and operation units 123 are operation members for inputting various types of instructions into the system control unit 101. By selecting various functional icons displayed on the display unit 117, appropriate functions for each situation are assigned to each operation member of the operation units 123, and the operation units 123 thus act as various function buttons. Examples of these function buttons include an end button, a back button, an image scrolling button, a jump button, a narrow-down button, an attribute change button and the like. For example, a menu screen that enables various settings to be made is displayed on the display unit 117 by pressing the menu button. The user can make various settings intuitively by using the menu screen, which is displayed on the display unit 117, four-direction buttons and a SET button. Note that included among the operation units 123 is also a touch panel (touch screen) that is capable of detecting a contact on the display unit 117.

Figure 2A:
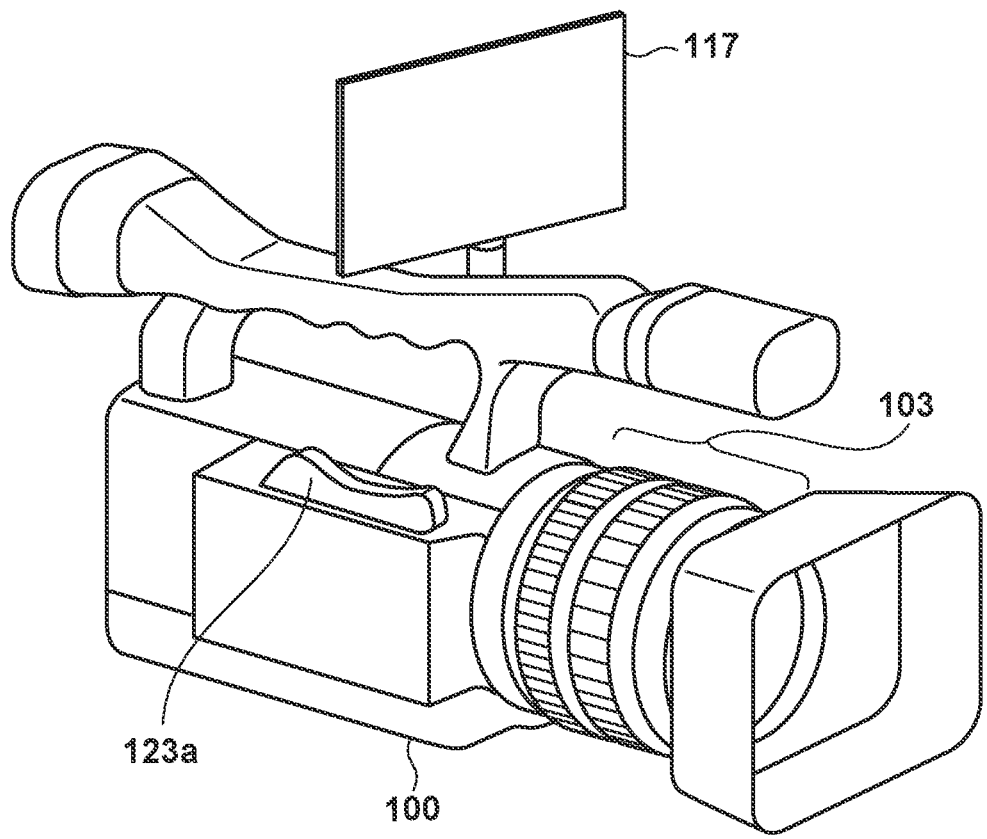
FIG. 2A is an external view illustrating the image capture control apparatus according to the present embodiment.
Figure 2B:
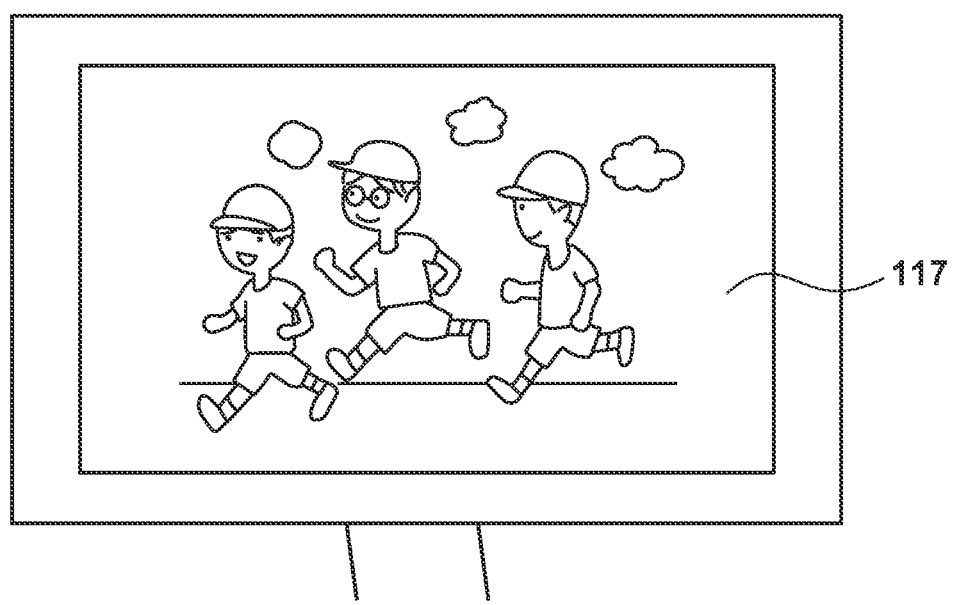
FIG. 2B shows a display unit of the image capture control apparatus according to the present embodiment as viewed from the display surface side.

A zoom lever 123*a*, which is shown in FIG. 2A, is one of the operation units 123. The zoom lever 123*a* is a rocker switch with two operating portions, and when one of the operating portions is operated in a direction, the other one operating portion moves in the opposite direction. The zoom lever 123*a* has a mechanism in which the greater the tilt of the lever, the larger the amount of change in voltage. The system control unit 101 detects the amount of change in voltage when the zoom lever 123*a* is operated, determines the level of zooming speed for variable-speed zoom in accordance with the detection result, and outputs a zoom driving signal to the zoom control unit 124. The zoom control unit 124 performs a zooming operation (i.e. controls the lens) at the zooming speed corresponding to the operation amount of the zoom lever 123*a*, by changing the position of the zoom lens included in the photographing lens 103, in accordance with the zoom driving signal.

The mode selection switch 121 switches the operation mode of the system control unit 101 to any of a still image shooting mode, a moving image recording mode, and a reproduction mode. The still image shooting mode includes an automatic shooting mode, an automatic scene determination mode, scene-specific shooting modes, a program AE mode, aperture priority AE mode (AV mode, hereinafter), shutter speed priority AE mode (TV mode, hereinafter), a custom mode, a manual mode (M mode, hereinafter) and the like. Using the mode selection switch 121, the mode is directly switched to any of the plurality of modes included in the still image shooting mode. Alternatively, it is also possible to switch, using the mode selection switch 121, to the still image shooting mode and then to switch, using another operation member, to any of the plurality of modes included in the still image shooting mode. Similarly, also the moving image recording mode may include a plurality of modes.

While the shutter-release button 122 provided on the camera 100 is being operated, that is, pressed half-way (the shooting preparation instruction), the first shutter switch 122*a* is turned on and generates a first shutter switch signal SW1. Upon receiving the first shutter switch signal SW1, the system control unit 101 causes the image processing unit 107 to start the AF (Automatic Focus) processing, the AE (Automatic Exposure) processing, the AWB (Automatic White Balance) processing, the EF (flash pre-emission) processing and the like.

When the operation of the shutter-release button 122 is completed, that is, the shutter-release button 122 is pressed fully (the shooting instruction), the second shutter switch 122*b* is turned on and generates a second shutter switch signal SW2. Upon receiving the second shutter switch signal SW2, the system control unit 101 starts a series of shooting processing from reading out the signal from the image capturing unit 105 to writing of image data to the recording medium 119.

The mode selection switch 121, a first shutter switch 122*a*, a second shutter switch 122*b* and operation units 123 are operation members for inputting various types of instructions into the system control unit 101. By selecting various functional icons displayed on the display unit 117, appropriate functions for each situation are assigned to each operation member of the operation units 123, and the operation units 123 thus act as various function buttons. Examples of these function buttons include an end button, a back button, an image scrolling button, a jump button, a narrow-down button, an attribute change button. For example, a menu screen that enables various settings to be made is displayed on the display unit 117 by pressing the menu button 105. The user can make various settings intuitively by using the menu screen, which is displayed on the display unit 117, four-direction (up, down, left, right) buttons and a SET button.

A power supply switch 114 is an operation member for turning on or off of a power supply.

A power control unit 115 is constituted by, for example, a battery detection circuit, a DC-DC converter, a switch circuit for changing over the block to be supplied with power, and detects whether a battery has been inserted or not, the type of the battery, and the residual capacity thereof.

Further, the power control unit 115 controls the DC-DC converter in accordance with the detection results and an instruction of the system control unit 101, and supplies a necessary voltage for a necessary length of time to each of the units including the recording medium 119.

A power supply unit 116 comprises a primary battery such as an alkaline battery or a lithium battery, a secondary battery such as an NiCd battery, an NiMH battery, or an Li-ion battery, or an AC adaptor. The recording medium interface (I/F) 118 is for interfacing with the recording medium 119 such as the memory card or hard disk. The recording medium 119 is a recording medium such as a memory card for recording shot images, and constituted by a semiconductor memory, a magnetic disk, or the like.

Zooming Speed Setting Processing

Next, zooming speed setting processing according to the present embodiment will be described with reference to FIGS. 3A to 6.

FIGS. 3A to 3D are flowcharts illustrating zooming speed setting processing according to the present embodiment. Note that processing in FIGS. 3A to 3D is realized as a result of a program stored in the nonvolatile memory 111 being loaded to the system memory 112 and executed by the system control unit 101. Also, processing in FIGS. 3A to 3D is performed when the camera 100 is in the still image shooting mode or the moving image recording mode.

In step S301, the system control unit 101 displays an image (hereinafter, "live view image") 500 acquired from the image capturing unit 105 on the display unit 117, as shown in FIG. 5A, and displays a MENU button 501 so as to overlap it on the live view image 500.

In step S302, the system control unit 101 determines whether or not a user operation has been made to the zoom lever 123a that is included in the operation units 123, advances the processing to step S303 if an operation has been made, and advances the processing to step S304 if not. In step S303, the system control unit 101 performs live view image zoom processing, which is optical zoom. The live view image zoom processing will be described later.

In step S304, the system control unit 101 determines whether or not the user has made an operation to select the MENU button 501 in the screen displaying the live view image 500 shown in FIG. 5A, using the four-direction buttons, the SET button, the touch panel, or the like included in the operation units 123. Processing proceeds to step S305 if the MENU button 501 has been selected in step S304, and returns to step S302 if not.

In step S305, the system control unit 101 performs control to display a black image generated in the memory 110 on the background, and also display a menu screen 502 shown in FIG. 5C, without displaying the live view image 500 on the display unit 117.

In step S306, the system control unit 101 determines whether or not the user has made an operation to select a zooming speed setting menu 503 in the menu screen 502 shown in FIG. 5C, using the four-direction buttons, the SET button, the touch panel, or the like included in the operation units 123. Processing proceeds to step S307 if the zooming speed setting menu 503 has been selected in step S306, and proceeds to step S330 if not.

Figure 6A:
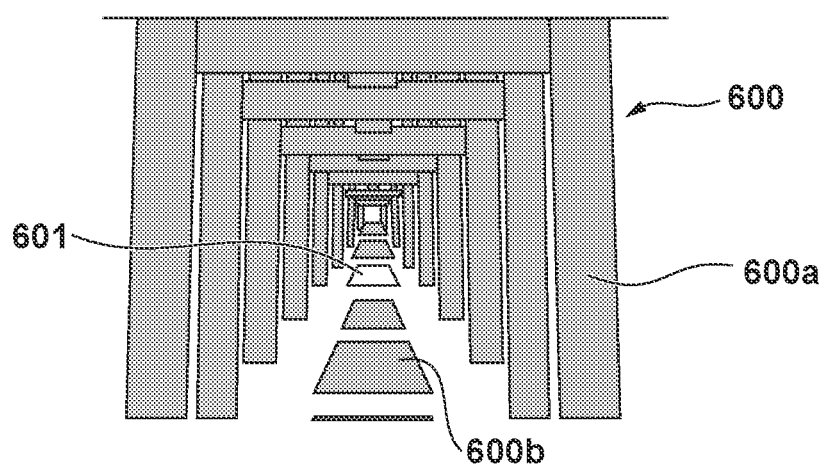
FIG. 6A shows an example of a sample image in a zooming speed setting screen according to the present embodiment.

In step S307, the system control unit 101 displays, as the background of the display unit 117, a sample image 600 for a zooming speed setting screen shown in FIG. 6A, without displaying the black image generated in the memory 110. The sample image 600 in FIG. 6A is a frame in a frame image group (sample image group) that includes frame images for a plurality of (e.g. 360) frames, and is displayed as a still image when the zoom lever 123a is not pressed. In one frame image, for example, a plurality of object items 600a and 600b that have the same shapes, respectively, and whose size decreases toward the depth direction, are displayed while being arranged at predetermined intervals. In the sample image 600 in FIG. 6A, toriis ("torii" means a gate at the entrance of a Shinto shrine) 600a and stepping stones 600b are arranged at predetermined intervals. In later-described steps S323 or S325, the system control unit 101 displays an animation (pseudo zooming display) that makes the user feel the zooming speed corresponding to the operation amount of a zooming operation, at a switching speed that corresponds to the operation amount of the zooming operation, using the frame image group of sample images that include the sample image 600. That is to say, based on the zooming speed that corresponds to the later-described zooming operation amount, an animation is displays in which the toriis 600a and the stepping stones 600b disappear and appear while continuously moving from the distal side toward the proximal side or from the proximal side toward the distal side as if a zooming operation is being performed, thereby expressing a sense of perspective. If a zoom-in instruction is given by pressing the zoom lever 123a, an animation is displayed in which the toriis are enlarged in accordance with the zoom instruction, and a new, small torii is displayed on the distal side (screen center) of the image. That is to say, as a result of the zoom-in operation, a first torii (first object) included in the sample image is displayed with its size enlarged from a first size to a second size, and a second torii (second object), which has the same display appearance as that of the first torii, is newly displayed with the first size. Conversely, if a zoom-out instruction is given by pressing the zoom lever 123a, an animation is displayed in which the toriis are reduced toward the screen center in accordance with the zoom instruction, and a large torii is newly displayed from the outer side of the screen. Even if a starting frame of the sample image group is displayed after an ending frame, the displayed picture appears as if the enlargement or reduction is continuing without a stop. For this reason, while the zooming operation is continued, the animation is displayed in a looped manner so that, after the animation of the sample image group has been displayed from the start to the end, it is displayed again from the start to the end. Thus, while the zooming operation is continued, the animation can be displayed as if zooming is continued without reaching either the tele end or the wide end.

In the case of electronic zoom by which a single image is electronically enlarged, rather than an animation using a plurality of frames, only a partial area, such as a center portion of an image, is displayed in an enlarged manner. After a subject that was displayed at the center when the zooming operation started is displayed in an enlarged manner, there is nothing to display further. Ultimately, the maximum magnification ratio is reached, and no further zooming can be performed. Even if enlarging an image with electronic zoom beyond the maximum magnification ratio is considered, ultimately a picture with a single color is displayed in which a single one of the pixels of the original image is fully enlarged over the entire screen, and the user cannot understand how the image is being zoomed. Conversely, in the case of electronic zoom by which a single image is electronically reduced, if the image is reduced beyond the magnification ratio at which the entire image exactly fits the display area, there is no image portion that newly appear from the outer side of the display area, and a no-image area then appears. However, if there are sample images for displaying an animation with a plurality of frames, an animation can be displayed in which the displayed image appears to continue to be zoomed without reaching either the tele end or the wide end, as long as a zooming operation is continued. For example, if ten toriis are seen when a zooming operation is started, a torii newly appears on the distal side upon a torii on the proximal side disappearing in accordance with the zooming operation. Thus, a situation does not occur in which a zoom-in operation is continuously performed but no more zooming can be performed at the point in time when the tenth torii is displayed. For the user, the torii on the proximal side seems to be gradually enlarged while the zooming operation is performed, and thus, the user can actually feel the zooming speed. Furthermore, since zooming can be continued without stopping at an end, zooming does not stop at an end before the user actually feels a sense of the zooming speed, and can readily feel the zooming speed for a long time. Particularly, in the screen for setting a zooming speed corresponding to the operation amount of the zoom lever 123a, the user understands the relationship between the operation amount and the set zooming speed before shooting, and thus can perform shooting smoothly. Furthermore, if the zooming speed can be set at a plurality of levels in accordance with the zooming operation amount, there may be cases where the zooming speed at a first level at which the zooming operation amount is associated with the range of the first level, the zooming speed at a second level at which the zooming operation amount is associated with the range of the second level, and so on, are tried in order, thereby checking a setting. In these cases, after the zooming speed at the first level has been checked while performing a zoom-in operation, the zooming speed at the second level can be successively checked by further increasing the zooming operation amount (i.e. further pressing the zoom lever 123a), without performing a zoom-out operation to restore the original state.

Note that the sample image 600 in FIG. 6A is an example, and the expression method thereof is not limited to this example and may alternatively be a test pattern image or a landscape image, for example.

Figure 6B:
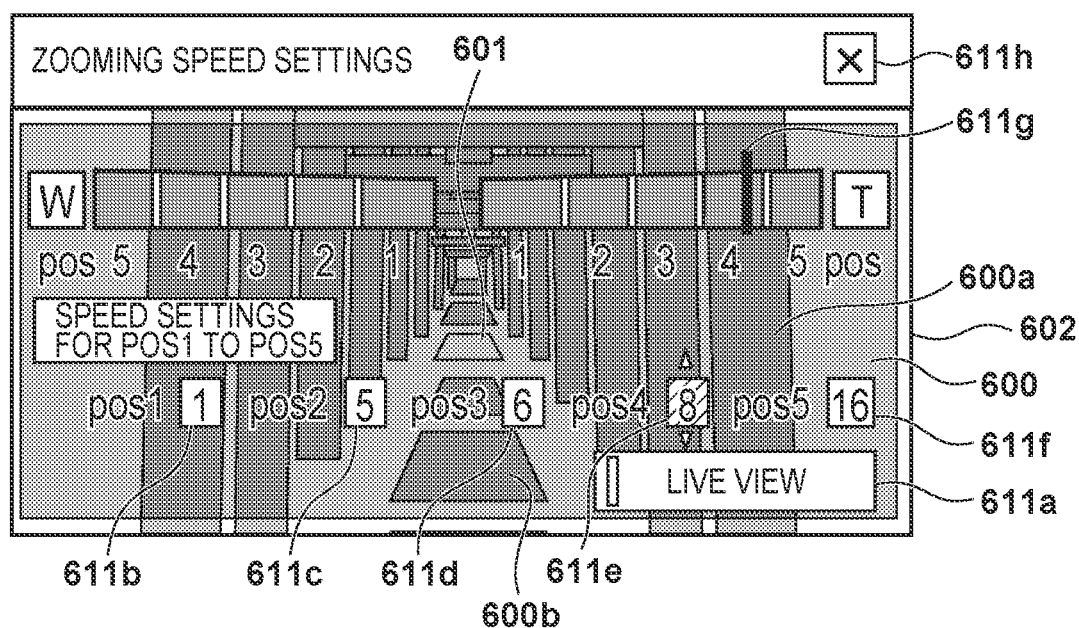
FIG. 6B shows an example in the case where a background image of the zooming speed setting screen according to the present embodiment is the sample image.

In step S308, the system control unit 101 displays, on the display unit 117, a zooming speed setting screen 602 shown in FIG. 6B for setting the zooming speed for the operation amount of the zoom lever 123a, with the sample image 600 shown in FIG. 6A serving as the background.

In step S309, the system control unit 101 determines whether or not the user has made an operation to select a background image switching button 611a in the zooming speed setting screen 602 shown in FIG. 6B, using the four-direction buttons, the SET button, the touch panel, or the like included in the operation units 123. Processing proceeds to step S310 if the button 611a has been selected in step S309, and returns to step S311 if not. The background image switching button 611a is for switching the background image of the zooming speed setting screen between the sample image and the live view image. FIG. 6B shows the zooming speed setting screen with the sample image serving as the background, and FIG. 6C shows the zooming speed setting screen with the live view image serving as the background.

Figure 6C:
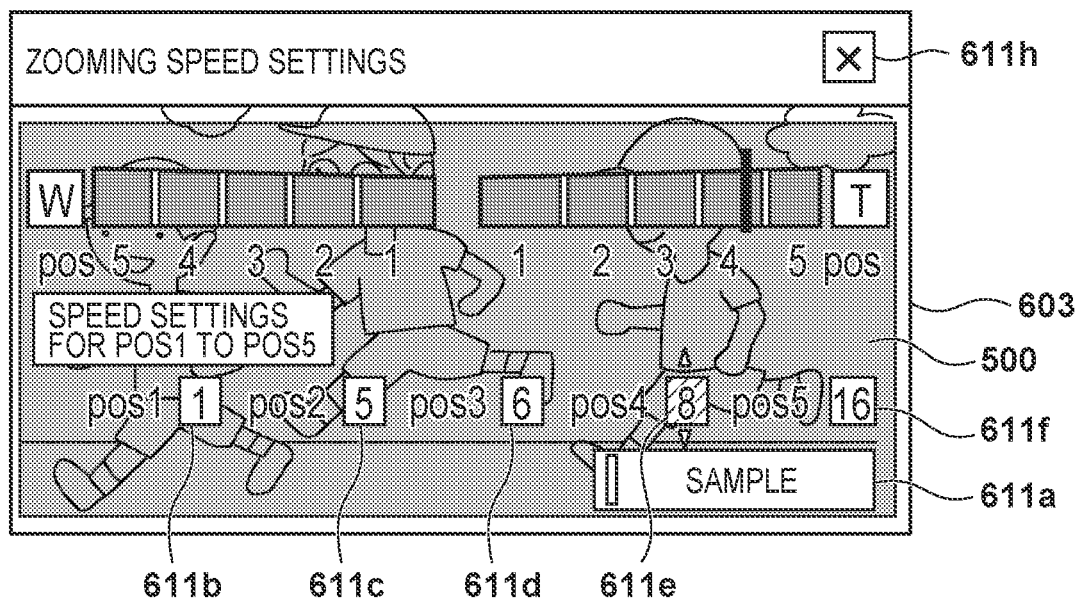
FIG. 6C shows an example in the case where the background image of the zooming speed setting screen according to the present embodiment is the live view image.

In step S310, when switching the background image to the live view image, the system control unit 101 switches the background image of the zooming speed setting screen 603 to the live view image 500, as shown in FIG. 6C. When switching the background image to the sample image, the system control unit 101 switches the background image of the zooming speed setting screen 602 to the sample image 600, as shown in FIG. 6B.

In step S311, the system control unit 101 determines whether or not the user has set the zooming speed in the screen 602 in FIG. 6B or the screen 603 in FIG. 6C, using the four-direction buttons, the SET button, the touch panel, or the like included in the operation units 123. Processing proceeds to step S312 if the zooming speed has been set in step S311, and proceeds to step S313 if not. The user selects any of pos1 to pos5, which are the operation amount levels of the zoom lever 123a, in the screen 602 in FIG. 6B or the screen 603 in FIG. 6C, and can set (change) a parameter of one of zooming speeds 611b to 611f corresponding to the selected operation amount level of the zoom lever 123a, in the range from 1 (low speed) to 16 (high speed).

The zoom lever 123a can be pressed toward both the lens 103 side and the opposite side, and is configured so that operation toward the lens 103 side is divided into five levels, operation toward the opposite side is also divided into five levels, and the divided levels on both sides are assigned operation amounts 1 to 5, respectively. Thus, in the setting screen, the zooming speed corresponding to each of the operation amounts of the zoom lever 123a can be set. Note that the same zooming speed is set for the same operation amount on both the zoom-in side (tele side, pressing the zoom lever 123a on the lens 103 side) and the zoom-out side (wide side, pressing the zoom lever 123a on the opposite side). That is to say, if a zoom-in speed α is set for the operation amount pos3 on the tele side, a zoom-out speed α is set for the operation amount pos3 on the wide side. The zooming speed is one of 16 zooming speeds, which is obtained by dividing the highest zooming speed of the attached lens that can be controlled by the camera, into 16 levels. If zooming speed 16 is set, zoom control is performed at the highest zooming speed, and if zooming speed 8 is set, zoom control is performed at a speed that is half the highest zooming speed.

In the screen 602 in FIG. 6B or the screen 603 in FIG. 6C, an example is shown in which operation amount pos4 of the zoom lever 123a is selected, and 8 is set as the parameter of the zooming speed 611e for the selected operation amount pos4 of the zoom lever 123a. Note that, instead of setting the zooming speed for the operation amount of the zoom lever 123a, the operation amount of the zoom lever 123a for the zooming speed may alternatively be set.

In step S312, the system control unit 101 records, in the memory 110, the parameter of one of the zooming speeds 611b to 611f set in step S311 corresponding to the selected operation amount level of the zoom lever 123a.

In step S313, the system control unit 101 determines whether or not a user operation has been made to the zoom lever 123a included in the operation unit 123, advances the processing to step S314 if an operation has been made, and advances the processing to step S319 if not.

In step S314, the system control unit 101 acquires the operation amount of the zoom lever 123a in step S313.

In step S315, the system control unit 101 acquires, from the memory 110, the currently-set zooming speed that corresponds to the operation amount of the zoom lever 123a acquired in step S314.

In step S316, the system control unit 101 displays the operation amount 611g of the zoom lever 123a and the corresponding, currently-set zooming speed, which is one of the zooming speeds 611b to 611f, as illustrated with items 611b to 611g in the screen 602 in FIG. 6B, and thus notifies the user thereof. In the example in FIG. 6B, it is displayed that zooming speed 8 is set for operation amount pos4 of the zoom lever 123a, and the user can check the current set values at a single glance by seeing the display.

In step S317, the system control unit 101 determines whether or not the background image of the screen 602 in FIG. 6B or the screen 603 in FIG. 6C is the sample image, advances the processing to step S318 if the background image is not the sample image, and advances the processing to step S320 if the background image is the sample image.

In step S318, the system control unit 101 performs live view image zoom processing, which is optical zoom processing, similarly to step S303, and advances the processing to step S319. Note that, here, a live view image obtained as a result of performing optical zoom is displayed as the background of the zooming speed setting screen. Since optical zoom is performed here, zooming stops upon reaching the tele end during a zoom-in operation, and zooming also stops upon reaching the wide end during a zoom-out operation. If the tele end is reached as a result of the zoom-in operation, the zoom lens position has reached the tele end, and accordingly, zoom-in corresponding to a new zoom-in operation cannot be performed unless a zoom-out operation is performed once. On the other hand, if the wide end is reached as a result of the zoom-out operation, the zoom lens position has reached the wide end, and accordingly, zoom-out corresponding to a new zoom-out operation cannot be performed unless a zoom-in operation is performed once.

In step S320, the system control unit 101 determines whether or not the position reached as a result of moving (the position to which the animation in the pseudo zooming display has moved) in accordance with the operation amount of the zoom lever 123a in step S313 has reached a predetermined position. The processing proceeds to step S321 if the determination result is that the predetermined distance position has been reached, and proceeds to step S322 if not.

In step S321, the system control unit 101 displays, as a position index, a predetermined object item that has a display appearance different from that of other objects in the sample image, every time the predetermined distance position is reached (i.e. every time the pseudo zooming display is performed by a predetermined amount). In the sample image 600 in FIG. 6A, if the position reached as a result of moving in accordance with the zooming operation amount in step S321 has reached the predetermined distance position, a torii 600a or a stepping stone 600b that corresponds to this position 601 is displayed with a different color. Thus, the speed of movement of the predetermined distance can be displayed so as to be able to be readily understood. Note that any kind of mark other than color may also be provided instead.

A description has been given of the case where the sample image is displayed without stopping at the tele end or the wide end, in order to continuously show the degree of zooming. If similar subjects are sequentially displayed next to each other, there is a possibility that it is difficult for the user to understand the time taken to reach one position from another position at a set zooming speed. For this reason, by displaying an index at every predetermined distance as in step S321, e.g. at every five toriis, the user can readily understand the time taken to zoom for the predetermined distance. The predetermined object item may be displayed at the same position every time a zooming operation is performed for a predetermined distance, or may be displayed in advance with a different display appearance of a subject at every predetermined distance, e.g. at every five toriis or every five stepping stones.

In step S322, the system control unit 101 determines whether or not the zooming direction corresponding to the operation made to the zoom lever 123a in step S313 is the wide direction. If the determination result is that the zooming direction is not the wide direction (i.e. a zoom-in operation is being performed), the processing proceeds to step S323, and if the determination result is that the zooming direction is the wide direction (i.e. a zoom-out operation is being performed), the processing proceeds to step S325.

In step S323, the system control unit 101 performs a pseudo zooming display in which the sample image 600 in the zooming speed setting screen 602 shown in FIG. 6B is endlessly zoomed in the tele direction at the zooming speed acquired in step S315 in accordance with the operation made to the zoom lever 123a in step S313. In this case, driving for optical zoom is not performed. Specifically, while the zoom-in operation is continued, the frame images of the sample image group are sequentially displayed at a speed (i.e. frame rate, or thinning rate of frame images) of animation corresponding to the zooming operation amount in step S313. Thus, an animation is displayed in which the toriis, which are objects in the sample image, are enlarged at a speed corresponding to the zooming operation amount, and a new, small torii is displayed on the distal side (screen center) of the image. If the last frame (or top frame) of the sample image group is reached, animation display in the same direction is smoothly repeated from the top frame (or last frame) at the opposite end, as long as the zoom-in operation is continued. Thus, as long as the zoom-in operation is continued, a perspective view is continuously displayed in which the toriis 600a and the stepping stones 600b in the sample image 600 disappear and appear while sequentially moving from the distal side toward the proximal side. By continuously displaying such a perspective view, a picture effect of constantly zooming in the same direction is realized. Thus, the user can intuitively check the zooming speed corresponding to the zooming operation amount, with a sense of speed corresponding to the operation made to the zoom lever 123a.

In step S324, the system control unit 101 determines whether or not the zoom-in operation to the zoom lever 123a included in the operation units 123 is being continued, returns the processing to step S323 if the zoom-in operation is being continued, and advances the processing to step S319 if not.

In step S325, the system control unit 101 performs a pseudo zooming display in which the sample image 600 in the zooming speed setting screen 602 shown in FIG. 6B is endlessly zoomed in the wide direction at the zooming speed acquired in step S315 in accordance with the operation made to the zoom lever 123a in step S313. In this case, driving for optical zoom is not performed. Specifically, while the zoom-out operation is continued, the frame images of the sample image group are sequentially displayed at a speed (i.e. frame rate, or thinning rate of frame images) of animation corresponding to the zooming operation amount in step S313. Thus, animation is displayed so that the toriis, which are objects in the sample image, are reduced at the speed corresponding to the zooming operation amount, and a large torii is newly displayed from the outer side of the screen. If the top frame (or last frame) of the sample image group is reached, animation display in the same direction is smoothly repeated from the last frame (or the top frame) at the opposite end, as long as the zoom-out operation is continued. Thus, as long as the zoom-out operation is continued, a perspective view is continuously displayed in which the toriis 600a and the stepping stones 600b in the sample image 600 disappear and appear while sequentially moving from the proximal side toward the distal side. By continuously displaying such a perspective view, a picture effect of constantly zooming in the same direction is realized. Thus, the user can intuitively check the zooming speed corresponding to the zooming operation amount, with a sense of speed corresponding to the operation made to the zoom lever 123*a*.

In step S326, the system control unit 101 determines whether or not the user operation to the zoom lever 123*a* included in the operation units 123 is continued, returns the processing to step S325 if the user operation is continued, and advances the processing to step S319 if not.

In live view image zoom processing in steps S303 and S318 that will be described later using FIG. 4, if the background image is the live view image as in the zooming speed setting screen 603 in FIG. 6C, optical zoom control is performed in accordance with the actual operation made to the zoom lever 123*a*. Note that, here, a live view image obtained as a result of performing optical zoom is displayed as the background of the zooming speed setting screen. Since optical zoom is performed here, zooming stops upon reaching the tele end during a zoom-in operation, and zooming also stops upon reaching the wide end during a zoom-out operation. If the tele end is reached as a result of the zoom-in operation, the zoom lens position has reached the tele end, and accordingly, zoom-in corresponding to a new zoom-in operation cannot be performed unless a zoom-out operation is performed once. On the other hand, if the wide end is reached as a result of the zoom-out operation, the zoom lens position has reached the wide end, and accordingly, zoom-out corresponding to a new zoom-out operation cannot be performed unless a zoom-in operation is performed once. In contrast, since animation is continuously displayed with background image using the sample image group, as in the zooming speed setting screen 602 shown in FIG. 6B, the change in the picture corresponding to the zooming speed does not stop while the zooming operation is continued. By thus continuously displaying a pseudo zooming state, the user can physically feel the zooming speed and sufficiently check the zooming speed corresponding to the zooming operation amount.

In step S319, the system control unit 101 determines whether or not the user has made an operation to select a screen close button 611*h* in the zooming speed setting screen 602 shown in FIG. 6B, using the four-direction buttons, the SET button, the touch panel, or the like included in the operation units 123. Processing returns to step S305 if the screen close button 611*h* has been selected in step S319, and returns to step S309 if not.

Processing to Zoom Live View Image

Figure 3A:
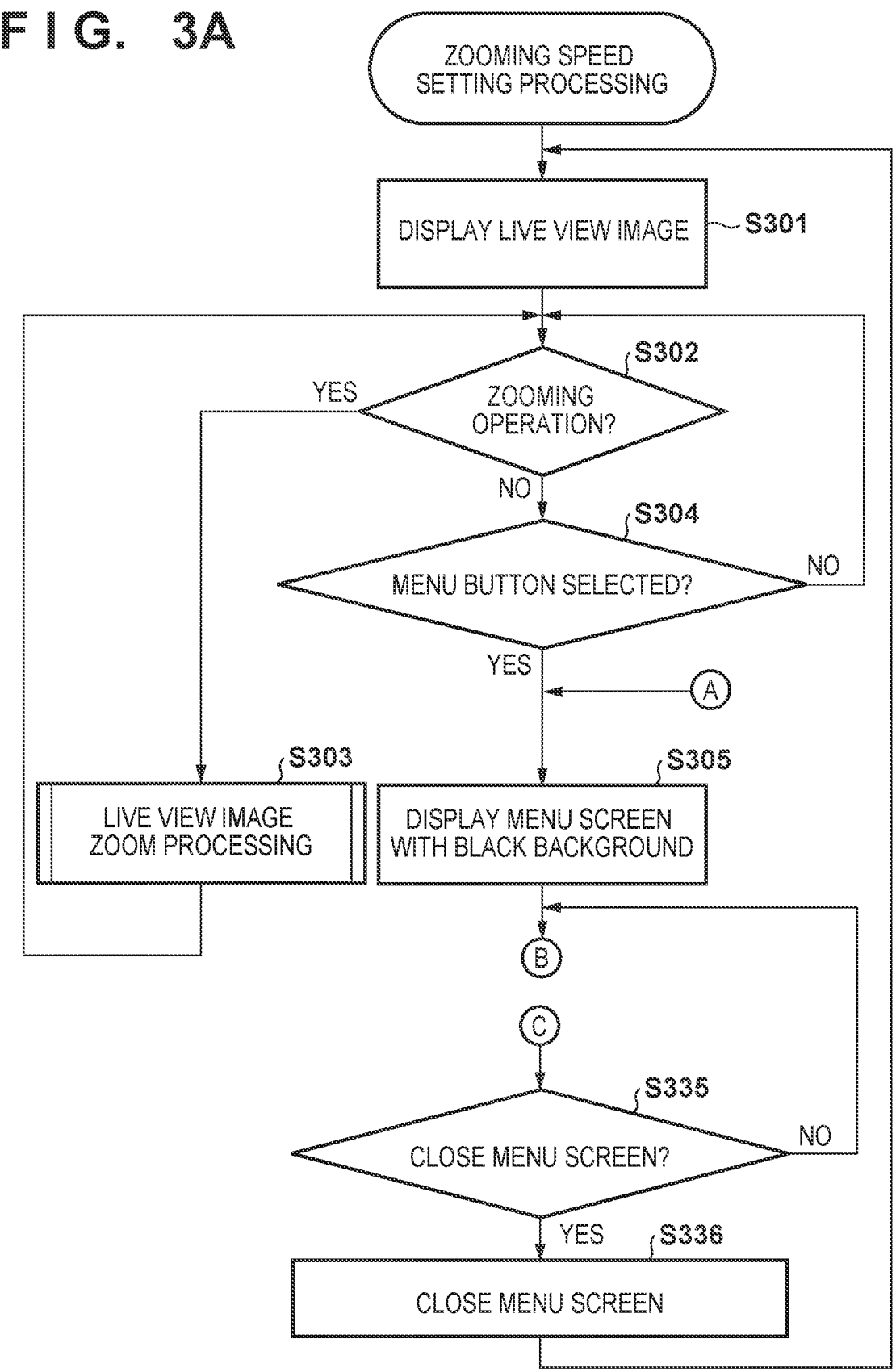
FIGS. 3A to 3D are flowcharts illustrating zooming speed setting processing according to the present embodiment.
Figure 3B:
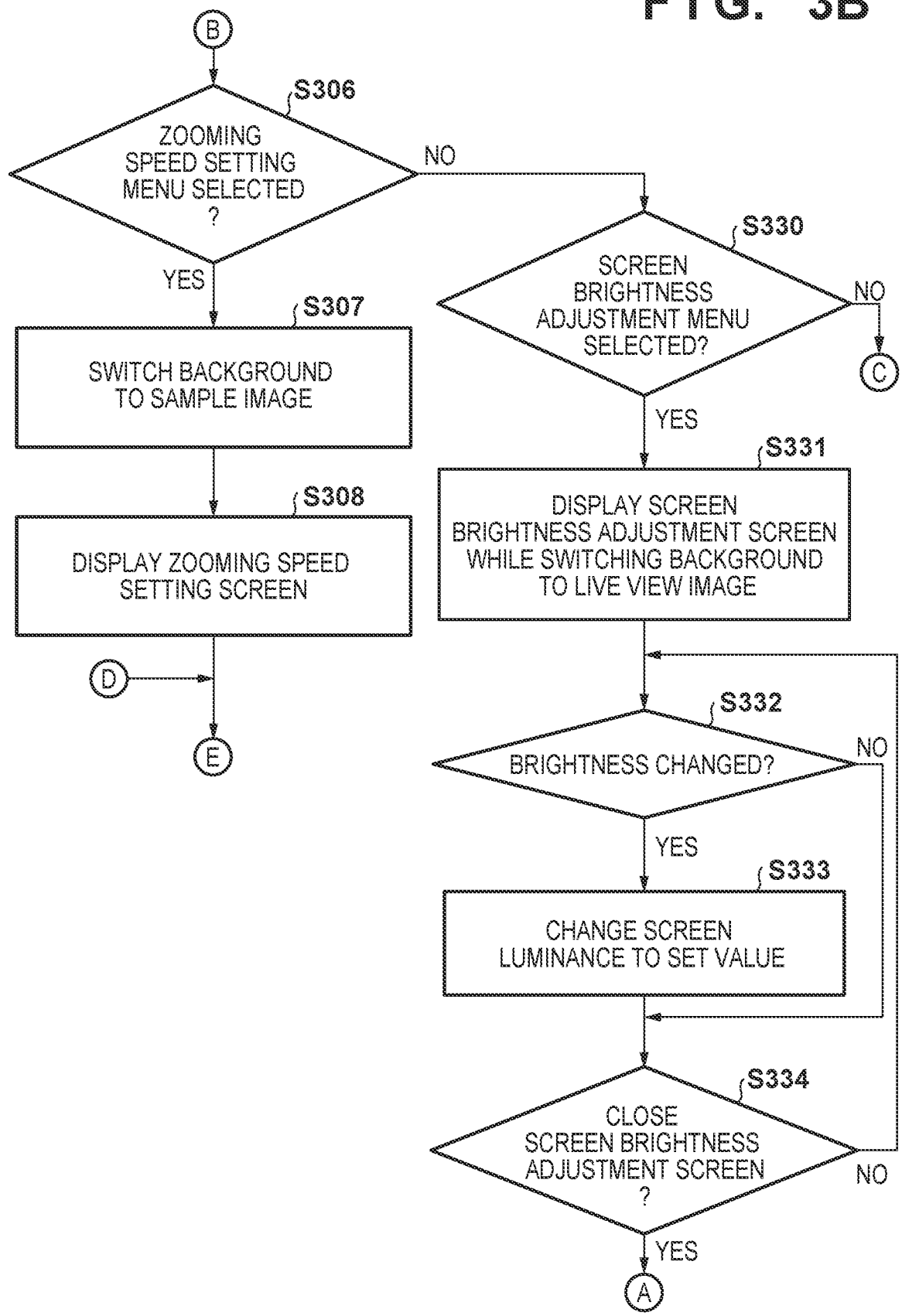
Figure 3C:
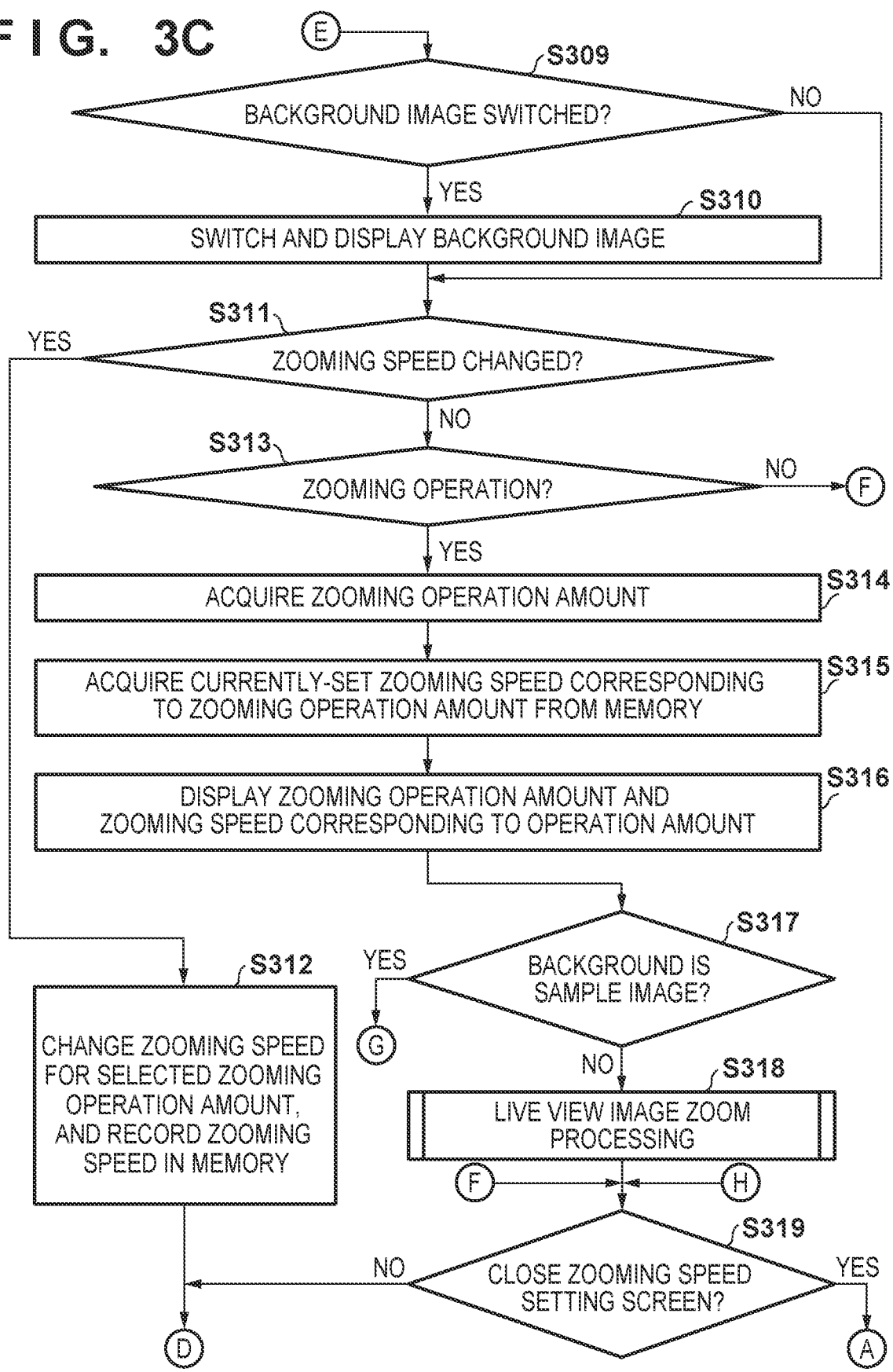
Figure 3D:
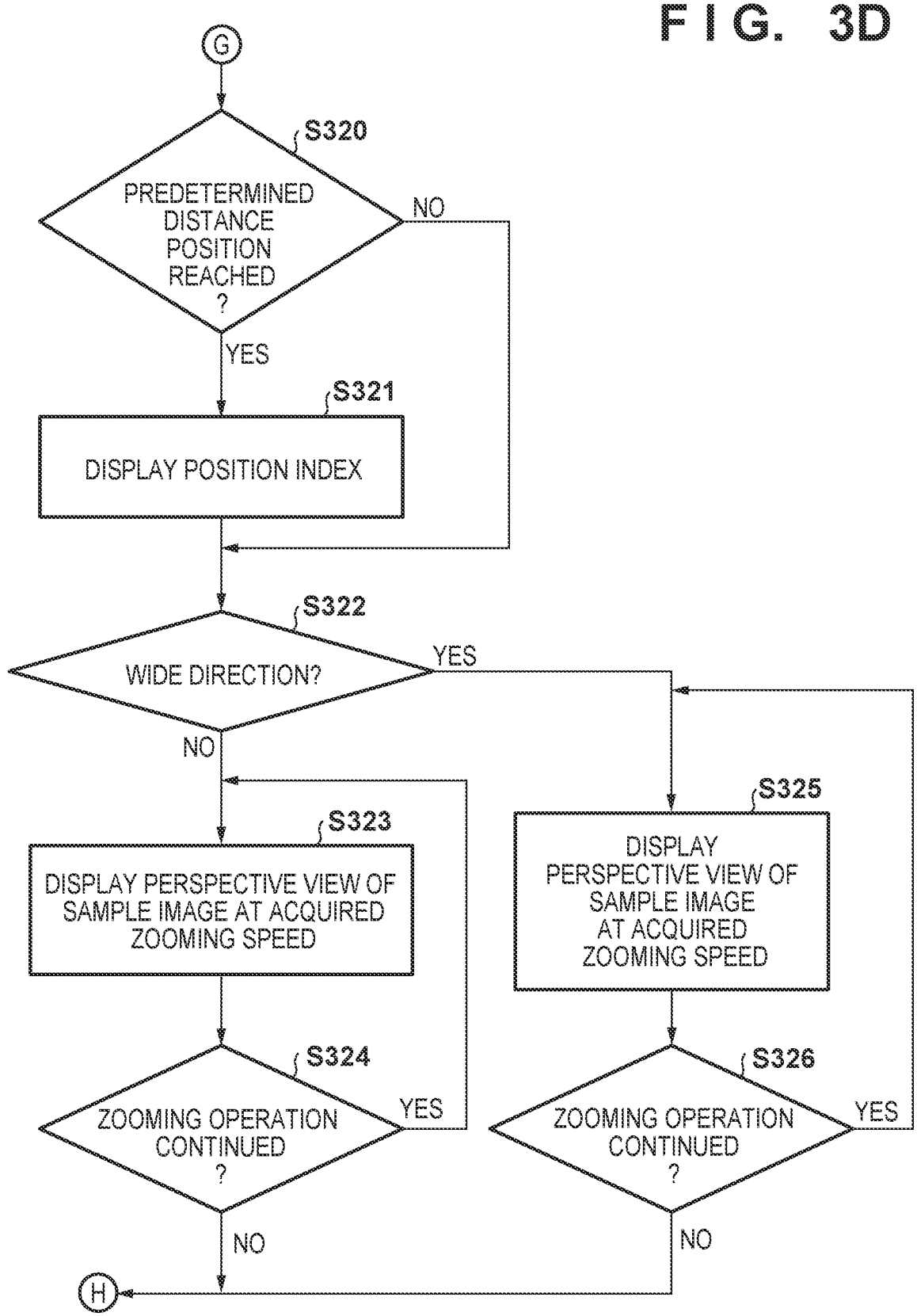
Figure 4:
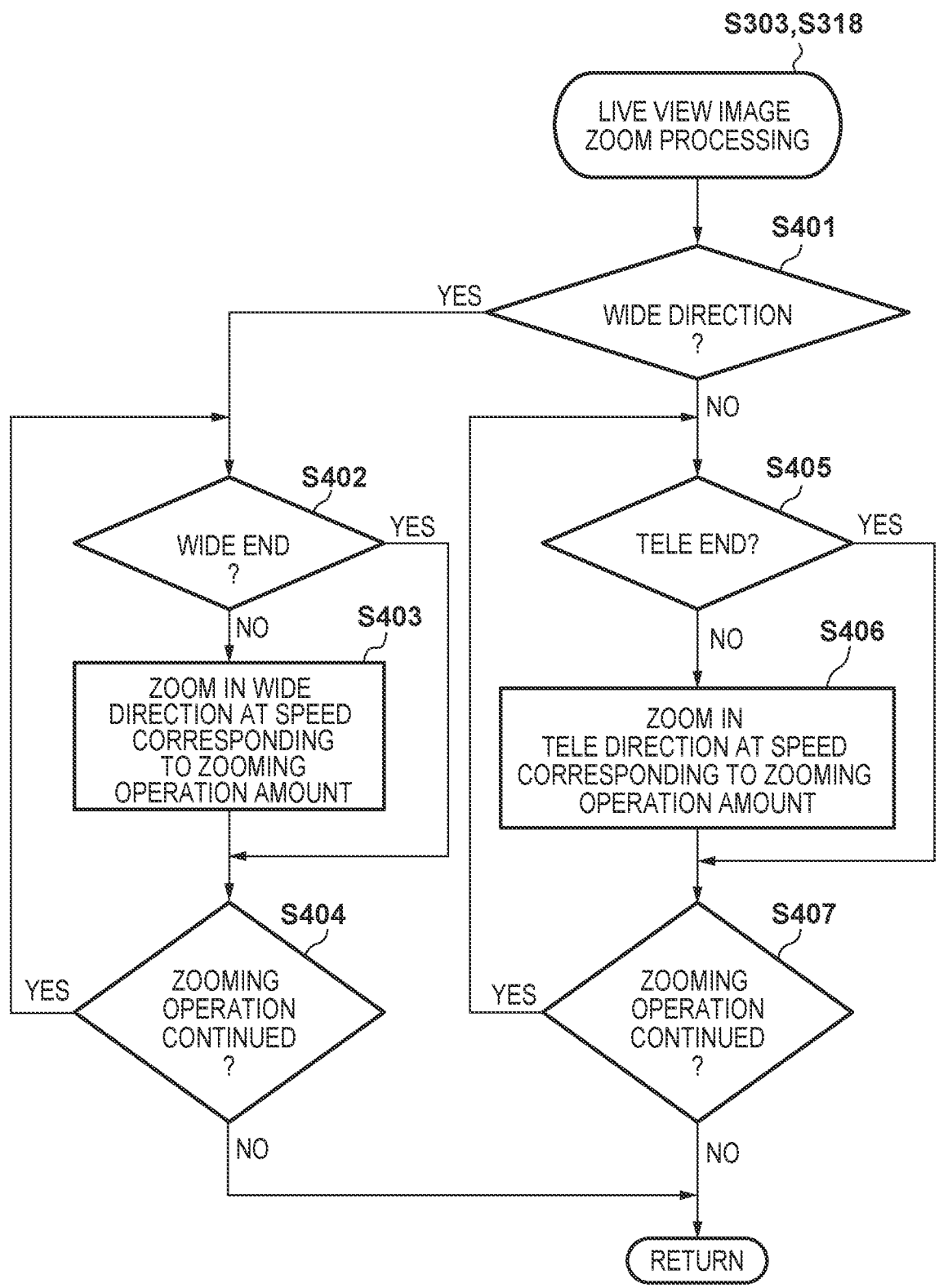
FIG. 4 is a flowchart illustrating zooming speed setting processing according to the present embodiment.

FIG. 4 is a flowchart illustrating live view image zoom processing in steps S303 in FIG. 3A and S318 in FIG. 3C.

In step S401, the system control unit 101 determines whether or not the operation to the zoom lever 123*a* in step S302 was made in the wide direction, advances the processing to step S402 if the operation was made in the wide direction, and advances the processing to step S405 if not.

In step S402, the system control unit 101 determines whether or not the current zoom position is the wide end, advances the processing to step S404 if the current zoom position is the wide end, and advances the processing to S403 if not.

In step S403, the system control unit 101 determines the zooming speed using a table in FIG. 5B in accordance with the operation amount of the zoom lever 123*a* in step S302, and controls the zoom control unit 124. The zoom control unit 124 moves the position of the zoom lens so that the live view image is zoomed in the wide direction at the determined zooming speed. That is to say, the zoom control unit 124 performs optical zoom. FIG. 5B shows an example of a table that defines zooming speed relative to the operation amount of the zoom lever 123*a*.

In step S404, the system control unit 101 determines whether or not the user operation to the zoom lever 123*a* included in the operation units 123 is being continued, returns the processing to step S402 if the user operation is being continued, and advances the processing to step S302 if not. Even if the zooming operation toward the wide end is being continued, the determination result in step S402 is YES if the zoom position reaches the wide end, and zoom driving is stopped (i.e. zoom driving in step S403 is not performed).

In step S405, the system control unit 101 determines whether or not the current zoom position is the tele end, advances the processing to step S407 if the current zoom position is the tele end, and advances the processing to S406 if not.

In step S406, the system control unit 101 determines the zooming speed using the table in FIG. 5B in accordance with the operation amount of the zoom lever 123*a* in step S302, and controls the zoom control unit 124. The zoom control unit 124 moves the position of the zoom lens so that the live view image is zoomed in the tele direction at the determined zooming speed. That is to say, the zoom control unit 124 performs optical zoom.

In step S407, the system control unit 101 determines whether or not the user operation to the zoom lever 123*a* included in the operation units 123 is being continued, returns the processing to step S405 if the user operation is continued, and advances the processing to step S302 if not. Even if the zooming operation toward the tele end is being continued, the determination result in step S405 is YES if the zoom position reaches the tele end, and zoom driving is stopped (i.e. zoom driving in step S406 is not performed).

Screen Brightness Adjustment Processing

In step S330, the system control unit 101 determines whether or not the user has made an operation to select a screen brightness adjustment menu 504 in the menu screen 502 shown in FIG. 5C, using the four-direction buttons, the SET button, the touch panel, or the like included in the operation units 123. Processing proceeds to step S331 if the screen brightness adjustment menu 504 has been selected in step S330, and proceeds to step S335 if not.

Figure 6D:
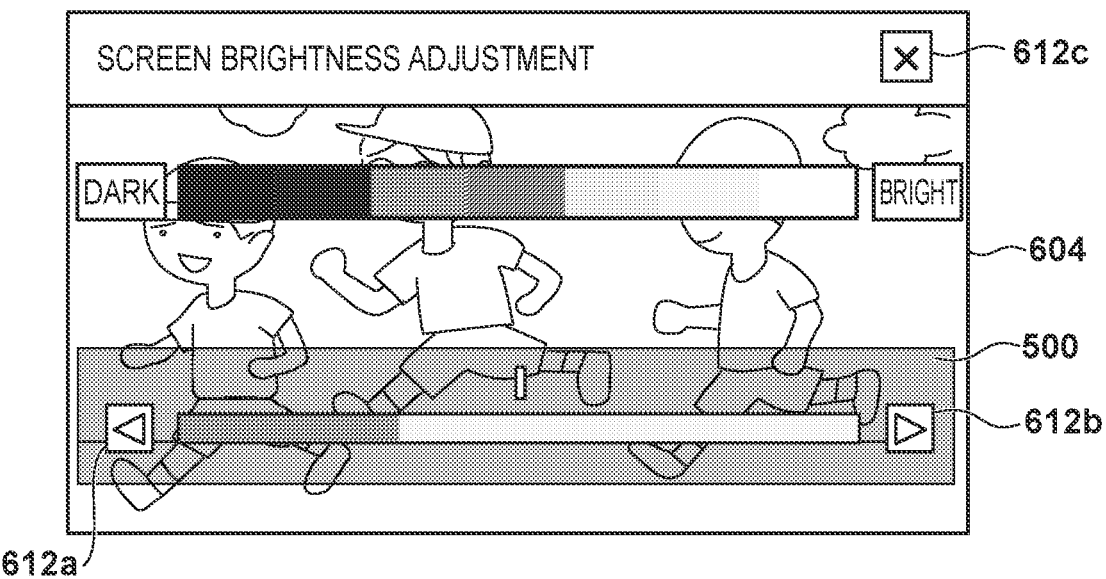
FIG. 6D shows an example of a screen brightness adjustment screen according to the present embodiment.

In step S331, the system control unit 101 displays, on the display unit 117, a screen 604 shown in FIG. 6D for adjusting screen brightness with the live view image 500 serving as the background image. The user can operate a darker-direction button 612*a* or a brighter-direction button 612*b* in the screen brightness adjustment screen 604 in FIG. 6D to set the screen brightness to any brightness. The screen brightness adjustment screen 604 in FIG. 6D shows an example in which the screen brightness is set to the third level from the darkest level, out of seven level.

In step S332, the system control unit 101 determines whether or not the user has set the brightness in the screen brightness adjustment screen 604 in FIG. 6D, using the four-direction buttons, the SET button, the touch panel, or the like included in the operation units 123. Processing proceeds to step S333 if the user has set the brightness in step S332, and proceeds to step S334 if not.

In step S333, the system control unit 101 records, in the memory 110, a parameter of the screen brightness set in step S332, and performs control to change the luminance of the backlight of the display unit 117 based on the set brightness.

In step S334, the system control unit 101 determines whether or not the user has made an operation to select a screen close button 612c in the screen brightness adjustment screen 604 in FIG. 6D, using the four-direction buttons, the SET button, the touch panel, or the like included in the operation units 123. Processing returns to step S305 if the screen close button 612c has been selected in step S334, and returns to step S332 if not.

In step S335, the system control unit 101 determines whether or not the user has made an operation to select a button 505 for closing the menu screen 502 shown in FIG. 5C, using the four-direction buttons, the SET button, the touch panel, or the like included in the operation units 123. Processing proceeds to step S336 if the user has selected the button 505 for closing the menu screen 502 in step S335, and proceeds to step S306 if not.

In step S336, the system control unit 101 closes the menu screen 502 shown in FIG. 5C, and returns the processing to step S301.

According to the above embodiment, the user can physically feel the zooming speed corresponding to the zooming operation amount in the zooming speed setting screen, and intuitively check the zooming speed. According to the present embodiment, if the background image is the sample image 600 as in the zooming speed setting screen 602 in FIG. 6B, actual zoom control is not performed, and a pseudo perspective view is continuously displayed as if the sample image 600 is endlessly zoomed at the set zooming speed. Accordingly, the user can set the zooming speed while sufficiently checking if the zooming speed is as intended by the user.

The above embodiment has described an example in which, if the sample image is displayed to show an animation corresponding to a zooming operation in the zooming speed setting screen, the animation is displayed in a looped manner as if the sample image is endlessly zoomed, but the present invention is not limited thereto. If a zooming operation is made by an operation amount that corresponds to the same specific zooming speed, an enlarging time in the pseudo zooming display with the animation using the sample image group is made longer than the time taken to zoom from the wide end to the tele end with optical zoom. That is to say, if a zoom-in operation is continued in the setting screen, enlarging pseudo zooming display is performed for a time longer than the time taken to zoom in at a specific zooming speed in accordance with the zoom-in operation made to the zoom lever 123a to reach the tele end from the wide end.

Thus, the zooming speed can be continuously checked for a time longer than the time during which optical zoom is performed. For example, if a zooming operation is continued for a long time that is obviously longer than the time taken to zoom from the wide end to the tele end with optical zoom, e.g. for one or two minutes, there is a possibility that this zooming operation is not intended by the user but is an erroneous operation, and thus, the animation is stopped. Then, if no new operation is thereafter made for a predetermined time, auto-power off may be performed to turn off the power and transition to a power-save mode.

To check the time required to zoom from the tele end to the wide end at the current zooming speed, the animation may intentionally be stopped when the same time as the time taken to reach the tele end or the wide end in the case of performing optical zoom at the current zooming speed has elapsed. However, zoom does not need to be restored in the pseudo zooming expression using animation. That is to say, pseudo zooming display corresponding to a zoom-in operation is performed upon the zoom-in operation being made, but if the zoom-in operation is continued until a predetermined condition is satisfied, the time taken to reach the tele end as a result of the zoom-in operation is simulated, and the animation is stopped. Thereafter, after the zoom-in operation is once ended (once canceled) (i.e. if the zoom lever 123a is no longer pressed), if a zoom-in operation is made again while no zoom-out operation is made, pseudo zooming display is performed so that the displayed image is enlarged in accordance with the zoom-in operation. Conversely, the time taken to reach the wide end as a result of a zoom-out operation is simulated, and the animation is stopped. Thereafter, after the zoom-out operation is once ended (once canceled) (i.e. if the zoom lever 123a is no longer pressed), if a zoom-out operation is made again while no zoom-in operation is made, the animation is displayed so that the displayed image is reduced again.

The above embodiment has described zooming as an example of the screens for performing processing in accordance with an operation amount. However, the present invention is not limited thereto, and is also applicable to a screen for changing colors or applying a predetermined effect, and a screen for setting reproduction speed of a moving image or music, or setting reproduction sound volume. That is to say, in the case of applying an effect of fading out or gradually deepening image colors, the degree of fade-out or the way the colors change is displayed in a setting screen using a sample image. In the case of color change, colors are gradually deepened, and are returned again to pale colors after reaching the deepest colors, so that the user can readily feel the speed of color change. Thus, the present embodiment is applicable to the cases where display is changed (i.e. the display state is gradually changed) so as to show the way processing is performed in accordance with a user operation.

Note that a single item of hardware may control the system control unit 101, or the entire apparatus may be controlled by a plurality of items of hardware sharing processing.

Although the present invention has been elaborated above based on suitable embodiments thereof, the present invention is by no means limited to these specific embodiments and includes various modifications without departing from the concept of the present invention. The above embodiments are merely illustrative embodiments of the present invention, and may be combined where appropriate.

Although the above embodiment has described the case of setting the zooming speed corresponding to the operation amount of the zoom lever 123a, the present invention may also be applied to an operation amount (pressure) of a button in a touch panel, or a physical button that enables an operation amount (pressure) to be detected. Although the present embodiment has described an example of performing optical zoom as an example of zoom control, the present invention may also be applied to electronic zoom by which a portion of a captured image is enlarged to electronically change the magnification ratio.

Although the above embodiment has described an example of setting the zooming speed corresponding to the zooming operation amount during zoom control, the present invention is not limited thereto, and is also applicable to various kinds of control to change the image display state in accordance with the operation amount of an operation member.

Although the above-described embodiment has described an example of applying the present invention to a digital video camera, the present invention is not limited thereto, and is also applicable to any apparatus that has a function of setting operational speed during control to change the image display state in accordance with the operation amount of an operation member. That is to say, the present invention is applicable to personal computers, tablet terminals, cellular phone terminals, smartphones, PDAs (portable information terminals), portable image viewers, music players, game machines, electronic book readers, and projectors, as well as medical devices, domestic appliances, in-vehicle devices, and so on that have a display. The display control apparatus according to the present invention is also applicable to image capture control apparatuses, such as smartphones, tablet terminals, and desktop PCs, that receive a live view image shot by a camera in a wired or wireless manner, display the received image, and remotely controls the camera (including a network camera).

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-186845, filed Sep. 27, 2017 and Japanese Patent Application No. 2018-110510, filed Jun. 8, 2018, which are hereby incorporated by reference herein in their entirety.

What is claimed is:
1. A display control apparatus comprising:
at least one processor or circuit to perform operations of the following units:
  (1) a detection unit configured to detect a user operation made to an operation member;
  (2) a control unit configured to perform control to perform zoom processing at a zooming speed corresponding to an operation amount of the operation member in accordance with an operation made to the operation member, while a live view image is being displayed; and
  (3) a display control unit configured to perform control to perform pseudo zooming display using a sample image that differs from the live view image, so that an object in the sample image is enlarged or reduced at a speed corresponding to the operation amount of the operation member in a setting screen for setting the zooming speed corresponding to an operation made to the operation member for the zoom processing,
  wherein, if an operation to zoom in that is made to the operation member is continued in the setting screen, the display control unit performs control to perform the pseudo zooming display in an enlarging direction for a time longer than a time taken to zoom in at a specific zooming speed in accordance with the operation made to the operation member and reach a telephoto end from a wide-angle end.

2. The apparatus according to claim 1, wherein the zoom processing is optical zoom.

3. The apparatus according to claim 2, wherein the control unit performs, as the zoom processing, control to drive a zoom lens in a photographing lens.

4. The apparatus according to claim 3, wherein the control unit does not drive the zoom lens even if an operation is made to the operation member in the setting screen.

5. The apparatus according to claim 1, wherein the pseudo zooming display is processing to display a group of a plurality of sample images as an animation at a speed corresponding to the operation amount.

6. The apparatus according to claim 5, wherein, in the pseudo zooming display, the display control unit displays the animation from a start to an end of the group of the plurality of sample images, and thereafter again displays the animation from the start to the end in a looped manner, while the operation made to the operation member is continued.

7. The apparatus according to claim 6, wherein the group of the plurality of sample images is an image group that appears as if enlargement and or reduction is continuing without a stop even if the start is displayed after the end.

8. The apparatus according to claim 1, wherein the display control unit controls the pseudo zooming display to stop the pseudo zooming display corresponding to a first operation, which is one of an operation to zoom in and an operation to zoom out that are made to the operation member, if the first operation is continued until a predetermined condition is satisfied, and perform the pseudo zooming display corresponding to the first operation if, after the first operation is thereafter canceled once, the first operation is made again without a second operation, which is the other one of the operation to zoom in and the operation to zoom out, being made.

9. The apparatus according to claim 1, wherein, in the setting screen, zooming speeds corresponding to a plurality of levels of the operation amount of the operation member can be set in accordance with a user operation.

10. The apparatus according to claim 9, wherein the display control unit performs control to perform the pseudo zooming display in the setting screen at a speed corresponding to the operation amount of the operation member based on a setting configured in the setting screen.

11. The apparatus according to claim 1, further comprising a switching unit configured to switch a background of the setting screen between the sample image and the live view image,
wherein, if the background of the setting screen is the sample image, the display control unit performs the pseudo zooming display in accordance with the operation made to the operation member, and
wherein if the background of the setting screen is the live view image, the display control unit does not perform the pseudo zooming display even if an operation is made to the operation member, and the control unit performs control to perform the zoom processing in accordance with the operation made to the operation member.

12. The apparatus according to claim 1, further comprising an image capturing unit configured to capture the live view image.

13. The apparatus according to claim 1, wherein the display control unit performs control to display, in the sample image, a position index whose display appearance differs from that of other objects, every time the pseudo zooming display is performed by a predetermined amount.

14. A control method of a display control apparatus, the method comprising:
detecting a user operation made to an operation member;
performing control to perform zoom processing at a zooming speed corresponding to an operation amount of the operation member in accordance with an operation made to the operation member, while a live view image is being displayed; and
performing control to perform pseudo zooming display using a sample image that differs from the live view image, so that an object in the sample image is enlarged or reduced at a speed corresponding to the operation amount of the operation member in a setting screen for setting the zooming speed corresponding to an operation made to the operation member for the zoom processing,
wherein, if an operation to zoom in that is made to the operation member is continued in the setting screen, the performing control to perform pseudo zooming display performs control to perform the pseudo zooming display in an enlarging direction for a time longer than a time taken to zoom in at a specific zooming speed in accordance with the operation made to the operation member and reach a telephoto end from a wide-angle end.

15. A non-transitory computer-readable storage medium storing a program for causing a computer to function as a display control apparatus comprising:
a detection unit configured to detect a user operation made to an operation member;
a control unit configured to perform control to perform zoom processing at a zooming speed corresponding to an operation amount of the operation member in accordance with an operation made to the operation member, while a live view image is being displayed; and
a display control unit configured to perform control to perform pseudo zooming display using a sample image that differs from the live view image, so that an object in the sample image is enlarged or reduced at a speed corresponding to the operation amount of the operation member in a setting screen for setting the zooming speed corresponding to an operation made to the operation member for the zoom processing,
wherein, if an operation to zoom in that is made to the operation member is continued in the setting screen, the display control unit performs control to perform the pseudo zooming display in an enlarging direction for a time longer than a time taken to zoom in at a specific zooming speed in accordance with the operation made to the operation member and reach a telephoto end from a wide-angle end.

16. A display control apparatus comprising:
at least one processor or circuit to perform operations of the following units:
a detection unit configured to detect a user operation made to an operation member;
a control unit configured to perform control to perform zoom processing at a zooming speed corresponding to an operation amount of the operation member in accordance with an operation made to the operation member, while a live view image is being displayed; and
a display control unit configured to perform control to perform pseudo zooming display using a sample image that differs from the live view image, so that an object in the sample image is enlarged or reduced at a speed corresponding to the operation amount of the operation member in a setting screen for setting the zooming speed corresponding to an operation made to the operation member for the zoom processing,
wherein the pseudo zooming display is processing to display a group of a plurality of sample images as an animation at a speed corresponding to the operation amount,
wherein, in the pseudo zooming display, the display control unit displays the animation from a start to an end of the group of the plurality of sample images, and thereafter again displays the animation from the start to the end in a looped manner, while the operation made to the operation member is continued, and
wherein the group of the plurality of sample images is an image group that appears as if enlargement and or reduction is continuing without a stop even if the start is displayed after the end.

17. A control method comprising:
detecting a user operation made to an operation member;
performing control to perform zoom processing at a zooming speed corresponding to an operation amount of the operation member in accordance with an operation made to the operation member, while a live view image is being displayed; and
performing control to perform pseudo zooming display using a sample image that differs from the live view image, so that an object in the sample image is enlarged or reduced at a speed corresponding to the operation amount of the operation member in a setting screen for setting the zooming speed corresponding to an operation made to the operation member for the zoom processing,
wherein the pseudo zooming display is processing to display a group of a plurality of sample images as an animation at a speed corresponding to the operation amount,
wherein, in the pseudo zooming display, the performing control to perform pseudo zooming display displays the animation from a start to an end of the group of the plurality of sample images, and thereafter again displays the animation from the start to the end in a looped manner, while the operation made to the operation member is continued, and wherein the group of the plurality of sample images is an image group that appears as if enlargement and or reduction is continuing without a stop even if the start is displayed after the end.

18. A non-transitory computer-readable storage medium storing a program for causing a computer to function as a display control apparatus comprising:
a detection unit configured to detect a user operation made to an operation member;
a control unit configured to perform control to perform zoom processing at a zooming speed corresponding to an operation amount of the operation member in accordance with an operation made to the operation member, while a live view image is being displayed; and
a display control unit configured to perform control to perform pseudo zooming display using a sample image that differs from the live view image, so that an object in the sample image is enlarged or reduced at a speed corresponding to the operation amount of the operation member in a setting screen for setting the zooming speed corresponding to an operation made to the operation member for the zoom processing,
wherein the pseudo zooming display is processing to display a group of a plurality of sample images as an animation at a speed corresponding to the operation amount,
wherein, in the pseudo zooming display, the display control unit displays the animation from a start to an end of the group of the plurality of sample images, and thereafter again displays the animation from the start to the end in a looped manner, while the operation made to the operation member is continued,
wherein the group of the plurality of sample images is an image group that appears as if enlargement and or reduction is continuing without a stop even if the start is displayed after the end.

19. A display control apparatus comprising:
at least one processor or circuit to perform operations of the following units:
a detection unit configured to detect a user operation made to an operation member;
a control unit configured to perform control to perform zoom processing at a zooming speed corresponding to an operation amount of the operation member in accordance with an operation made to the operation member, while a live view image is being displayed;
a display control unit configured to perform control to perform pseudo zooming display using a sample image that differs from the live view image, so that an object in the sample image is enlarged or reduced at a speed corresponding to the operation amount of the operation member in a setting screen for setting the zooming speed corresponding to an operation made to the operation member for the zoom processing; and
a switching unit configured to switch a background of the setting screen between the sample image and the live view image,
wherein, if the background of the setting screen is the sample image, the display control unit performs the pseudo zooming display in accordance with the operation made to the operation member, and
wherein if the background of the setting screen is the live view image, the display control unit does not perform the pseudo zooming display even if an operation is made to the operation member, and the control unit performs control to perform the zoom processing in accordance with the operation made to the operation member.

20. A control method comprising:
detecting a user operation made to an operation member;
performing control to perform zoom processing at a zooming speed corresponding to an operation amount of the operation member in accordance with an operation made to the operation member, while a live view image is being displayed;
performing control to perform pseudo zooming display using a sample image that differs from the live view image, so that an object in the sample image is enlarged or reduced at a speed corresponding to the operation amount of the operation member in a setting screen for setting the zooming speed corresponding to an operation made to the operation member for the zoom processing, and
switching a background of the setting screen between the sample image and the live view image,
wherein, if the background of the setting screen is the sample image, the performing control to perform pseudo zooming display performs the pseudo zooming display in accordance with the operation made to the operation member, and
wherein if the background of the setting screen is the live view image, the performing control to perform pseudo zooming display does not perform the pseudo zooming display even if an operation is made to the operation member, and the performing control to perform zoom processing performs control to perform the zoom processing in accordance with the operation made to the operation member.

21. A non-transitory computer-readable storage medium storing a program for causing a computer to function as a display control apparatus comprising:
a detection unit configured to detect a user operation made to an operation member;
a control unit configured to perform control to perform zoom processing at a zooming speed corresponding to an operation amount of the operation member in accordance with an operation made to the operation member, while a live view image is being displayed;
a display control unit configured to perform control to perform pseudo zooming display using a sample image that differs from the live view image, so that an object in the sample image is enlarged or reduced at a speed corresponding to the operation amount of the operation member in a setting screen for setting the zooming speed corresponding to an operation made to the operation member for the zoom processing; and
a switching unit configured to switch a background of the setting screen between the sample image and the live view image,
wherein, if the background of the setting screen is the sample image, the display control unit performs the pseudo zooming display in accordance with the operation made to the operation member, and
wherein if the background of the setting screen is the live view image, the display control unit does not perform the pseudo zooming display even if an operation is made to the operation member, and the control unit performs control to perform the zoom processing in accordance with the operation made to the operation member.

* * * * *